United States Patent
Faulhammer et al.

(10) Patent No.: US 6,713,596 B1
(45) Date of Patent: Mar. 30, 2004

(54) METHOD FOR ANIONIC POLYMERIZATION OF LACTAMES

(75) Inventors: Heike Faulhammer, Bernay (FR); Michel Biensan, Lons (FR); Franck Victorien, Caen (FR); Thierry Vivier, Serquigny (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/937,015

(22) PCT Filed: Mar. 24, 2000

(86) PCT No.: PCT/FR00/00749

§ 371 (c)(1), (2), (4) Date: Jan. 29, 2002

(87) PCT Pub. No.: WO00/58387

PCT Pub. Date: Oct. 5, 2000

(30) Foreign Application Priority Data

Mar. 26, 1999 (FR) .......................... 99 04118

(51) Int. Cl.$^7$ .......................... C07G 69/14
(52) U.S. Cl. .......................... 528/323; 528/354
(58) Field of Search .................. 528/323, 354

(56) References Cited

U.S. PATENT DOCUMENTS 5,747,634 A * 5/1998 Schmid et al. .............. 528/315

FOREIGN PATENT DOCUMENTS

| EP | 0231381 | 8/1987 |
|----|---------|--------|
| EP | 0491043 | 6/1992 |
| EP | 0786482 | 7/1997 |
| EP | 0786485 | 7/1997 |
| EP | 0791618 | 8/1997 |
| EP | 0872508 | 10/1998 |
| FR | 2291231 | 6/1976 |

* cited by examiner

Primary Examiner—Joseph K. McKane
Assistant Examiner—Kamel Saeed
(74) Attorney, Agent, or Firm—Millen & White et al.

(57) ABSTRACT

The invention relates to a novel process for the anionic polymerization of lactams, in which:

(a) (i) a catalyst capable of creating a lactamate and (ii) a regulator chosen from the amides of formula R1—NH—CO—R2, in which R1 can be substituted with a radical R3—CO—NH— or R3—O— and in which R1, R2 and R3 denote an aryl, alkyl or cycloalkyl radical, are dissolved in the molten lactam; the temperature of this reaction mixture being between the melting point of the lactam and 15° C. higher in order to ensure its good stability, (b) the solution from step (a) is introduced into a mixing device and is then heated to a temperature which is sufficient to obtain bulk polymerization of the lactam in no more than 15 minutes.

(b) is usually a continuous reactor, for example an extruder; however, it can be replaced with a mold.

21 Claims, No Drawings

METHOD FOR ANIONIC POLYMERIZATION OF LACTAMES

FIELD OF THE INVENTION

The present invention relates to a process for the bulk anionic polymerization of lactams with a catalytic system which is very stable at high temperature. This process operates in continuous or batch mode. By polymerizing the lactam in the presence of a polymer an alloy is obtained; it is also possible to work in the presence of fillers such as glass fibres to obtain a composite material. The catalytic system is a mixture of a sufficiently strong base capable of giving a lactamate, and an amide or a bisamide. This catalytic system is dissolved in the lactam, which consists for example of lactam 12. This solution is stable for 24 hours at 160° C. It suffices to heat to between 200 and 350° C., preferably between 230 and 300° C., for polymerization to take place within a few minutes.

PRIOR ART AND TECHNICAL PROBLEM

Patent application BE 1,007,446 A3 published on Jul. 4, 1995 describes the polymerization of caprolactam in the presence of lactamate (sodium or potassium lactamate), of poly(p-phenylene terephthalamide) (PPTA) fibres, and of a product chosen from (i) polyisocyanates blocked with lactams and (ii) acyllactams such as, for example, terephthaloylbiscaprolactam or adipoylbis-caprolactam. These blocked polyisocyanates and these acyllactams are imides or bisimides rather than amides or bisamides.

Chapter 19, pages 255 to 266 of the Book of Abstracts 212 ACS Meeting (1996), published in 1998 by the American Chemical Society, describes the polymerization of caprolactam in the presence of lactamate and N-acyllactams; this is the same process as in the prior art. This means that the two components of the catalytic system are mixed separately with the lactam and placed in contact in the polymerization reactor either in batch mode or in continuous mode. The disadvantage of this process is that the process is required to accurately meter these two flows of the reaction mixture in order to obtain a product with desired properties.

Patent application EP 786,483 describes the polymerization of lactams using a solution of a lactamate and an imide in the lactam, which is poured into the lactam to be polymerized. This catalytic system is unstable, since it consists of lactam 12 which reacts at and above 175° C.

Patent application FR 2,291,231 describes the polymerization of lactams in the presence of a catalytic system consisting (i) of a product chosen from sodium, potassium, alkali metal hydrides and hydroxides, and (ii) of a product chosen from organic isocyanates, ureas, amides and acid chlorides. The example describes only the use of sodium hydride and a promoter, without specifying its name. The extruder is fed with the mixture of lactam, hydride and promoter at 170° C., the extruder being at 250° C. Nothing is written or suggested regarding storage of this solution of unknown composition, and even less so regarding its stability.

Patent FR 1,565,240 describes the polymerization of lactam 12 in toluene using sodium methoxide and an amide such as acetanilide. The reaction takes place in a glass tube heated to 197° C.

BRIEF DESCRIPTION OF THE INVENTION

The Applicant has now developed a novel process for the anionic polymerization of lactams, in which:

(a) (i) a catalyst capable of creating a lactamate and (ii) a regulator chosen from the amides of formula R1—NH—CO—R2, in which R1 can be substituted with a radical R3—CO—NH— or R3—O— and in which R1, R2 and R3 denote an aryl, alkyl or cycloalkyl radical, are dissolved in the molten lactam; the temperature of this reaction mixture being between the melting point of the lactam and 15° C. higher, (b) the solution from step (a) is introduced into a mixing device and is then heated to a temperature which is sufficient to obtain bulk polymerization of the lactam in no more than 15 minutes.

The inventors have discovered that this solution of step (a) was particularly stable.

According to a second embodiment of the invention, molten lactam not containing the mixture of catalyst and regulator is also introduced into step (b), i.e. the solution from step (a) is a master batch containing more catalyst and regulator than are required to polymerize the lactam in which they are dissolved.

In a third embodiment of the invention, polymerization of the lactam is carried out in the presence of one or more polymers (A) which are introduced either into the solution (a) or into the mixing device in step (b) or into the molten lactam which is added in addition according to the second embodiment of the invention, or according to any combination of these possibilities.

According to a fourth embodiment of the invention, polymerization of the lactam is carried out in the presence of one or more fillers which are introduced either into the solution (a) or into the mixing device in step (b) or into the molten lactam which is added in addition according to the second embodiment of the invention, or according to any combination of these possibilities. The third and fourth embodiments of the invention can also be combined.

According to a second embodiment of the invention, step (b) is replaced with step (b1) in which the solution from step (a) is introduced into a mould and is then heated to a temperature which is sufficient to obtain bulk polymerization of the lactam in no more than 15 minutes, and a polyamide article is thus obtained directly (so-called "RIM" technology). This second embodiment can also be carried out according to several forms as above.

According to a second form of the second embodiment, molten lactam containing neither catalyst nor regulator is added in step (b1) in addition to the solution from step (a) which is a masterbatch, and this molten lactam is optionally mixed in line with that obtained from step (a) before introduction into the mould.

According to a third form of the second embodiment, the polymerization of the lactam is carried out in the presence of one or more polymers (A) which are introduced either into the solution from step (a) or into the mould or into the molten lactam which is added in the second form in addition to that obtained from (a), or alternatively during the in-line mixing in this second form, or a combination of all these possibilities.

According to a fourth form of the second embodiment, the polymerization of the lactam is carried out in the presence of one or more fillers which are introduced either into the solution from step (a) or into the mould or into the molten lactam which is added in the second form in addition to that obtained from (a) or alternatively during the in-line mixing in this second form, or a combination of all these possibilities. The third and fourth forms of the invention can also be combined.

DETAILED DESCRIPTION OF THE INVENTION

As examples of lactams, mention may be made of those containing from 3 to 12 carbon atoms on the main ring and which can be substituted. Mention may be made, for example, of β,β-dimethyl-propiolactam, α,α-dimethyl-propiolactam, amylolactam, caprolactam, capryllactam and lauryllactam. The invention is particularly useful for caprolactam and lauryllactam.

The catalyst is a base which is strong enough to create a lactamate. Examples of catalysts which may be mentioned are sodium, potassium, alkali metal hydrides and hydroxides, and alkali metal alkoxides such as sodium methoxide or ethoxide.

As regards the regulator and the radicals R1, R2 and R3, examples of aryl radicals can be phenyl, para-tolyl and alpha-naphthyl. Examples of alkyls can be methyl, ethyl, n-propyl and n-butyl radicals and an example of a cycloalkyl radical is the cyclohexyl radical.

The preferred amides are those in which R1 and R2, which may be identical or different, are phenyl or an alkyl containing not more than 5 carbon atoms, it being possible for R1 to be substituted with R3—O— and R3 being an alkyl containing not more than 5 carbon atoms. Mention may be made, for example, of acetanilide, benzanilide, N-methylacetamide, N-ethylacetamide, N-methylformamide and (4-ethoxyphenyl)acetamide. Other preferred amides are alkylenebisamides such as ethylenebisstearamide (EBS) and ethylenebisoleamide.

The ratio of the catalyst to the regulator, in moles, can be between 0.5 and 2 and preferably between 0.8 and 1.2. For the regulator, this is the number of moles of amide groups.

The proportion of catalyst in the lactam can be between 0.1 and 5 mol per 100 mol of lactam, and preferably between 0.3 and 1.5. As regards the first mode of the invention, the first or second embodiment, it is these proportions of catalyst and of regulator which are in the lactam in step (a). As regards the second form of the invention, of the first or second mode, i.e. if the solution from step (a) is a masterbatch, the proportions in the solution in step (a) are higher, but these proportions (0.1 to 5 per 100 mol of lactam) are respected relative to the entire lactam employed in the polymerization in step (b) or (b1). The proportion of catalyst in this solution from step (a), considered as the masterbatch, is advantageously between 5 and 50 mol per 100 mol of lactam. As regards the other embodiments of the invention, the first or second mode, these proportions (0.1 to 5 per 100 mol of lactam) are respected relative to the entire lactam employed in step (b) or (b1).

The catalyst and the regulator are added to the molten lactam which has been dehydrated and inertized beforehand. The temperature of the stable solution in step (a) is generally between the melting point and 15° C. above this. As regards lactar 12, this temperature is between 155 and 180° C. and preferably between 160 and 170° C. The process is performed at atmospheric pressure; it is not necessary to complicate the apparatus since the pressure has no effect on the polymerization. On the other hand, distillations under vacuum can be carried out in order to dehydrate the lactam, optionally the catalyst and the regulator.

In step (b) or (b1), the lactam, the catalyst, the regulator and optionally the polymer (A) and/or the fillers are brought to a temperature which is sufficient to obtain the bulk polymerization of all the lactam. The higher this temperature, the faster the reaction. For example, for lactam 12, this temperature is between 200 and 350° C. and preferably between 230 and 300° C. As regards caprolactam, this temperature is between 200 and 350° C. and preferably between 230 and 300° C. It is recommended that the temperature chosen for the polymerization should be greater than the melting point of the polymer obtained. The duration of the polymerization is generally less than 15 minutes and in general about 2 to 5 minutes. The step (b) can be carried out in any continuous reactor device used for polymerization in the molten state, such as a blender or an extruder. Step (b1) is carried out in the usual devices for "RIM" technology.

The third form of the invention, of the first or second embodiment, is particularly useful for preparing mixtures (or alloys) of polymers. By polymerizing the lactam in the presence of the polymer (A), a much more intimate mixture of the polylactam (polyamide) and of the polymer (A) is obtained than by the usual process of mixing (or blending) the polymer (A) and the polyamide in the molten state. This is likewise the case in the fourth form of the invention, of the first or second embodiment, which results in better contact between the polyamide and the fillers. The polymer (A) can be partly dissolved in the lactam or introduced into the device in step (b) or (b1) in the molten state or in finely divided solid form (between 0.1 and 10 μm for example). It would not constitute a departure from the context of the invention to use several polymers (A).

As examples of polymers (A), mention may be made of optionally functionalized polyolefins, polyamides and polyphenylene-oxide. As regards the polymer (A) which is a polyolefin, it may or may not be functionalized or may be a mixture of at least one functionalized and/or at least one non-functionalized polyolefin. For the sake of simplicity, functionalized polyolefins (A1) and non-functionalized polyolefins (A2) have been described below.

A non-functionalized polyolefin (A2) is conventionally a homopolymer or copolymer of alpha-olefins or of diolefins, such as, for example, ethylene, propylene, 1-butene, 1-octene or butadiene. Examples which may be mentioned are:

polyethylene homopolymers and copolymers, in particular LDPE, HDPE, LLDPE (linear low density polyethylene), VLDPE (very low density polyethylene) and metallocene polyethylene;

propylene homopolymers or copolymers;

ethylene/alpha-olefin copolymers such as ethylene/propylene copolymers, EPR (abbreviation for ethylene-propylene-rubber) and ethylene/propylenel/diene (EPDM) copolymers;

styrene/ethylene-butene/styrene (SEBS), styrene/butadiene/styrene (SBS), styrene/isoprene/styrene (SIS) and styrene/ethylene-propylene/styrene (SEPS) block copolymers;

copolymers of ethylene with at least one product chosen from salts or esters of unsaturated carboxylic acids such as alkyl (meth)acrylate (for example methyl acrylate) or vinyl esters of saturated carboxylic acids such as vinyl acetate, the proportion of comonomer possibly being up to 40% by weight.

The functionalized polyolefin (A1) can be an alpha-olefin polymer containing reactive units (functionalities); such reactive units are acid, anhydride or epoxy functions. Examples which may be mentioned are the above polyolefins (A2) grafted or co- or terpolymerized with unsaturated epoxides such as glycidyl (meth)acrylate, or with carboxylic acids or the corresponding salts or esters, such as (meth) acrylic acid (which may be totally or partially neutralized with metals such as Zn, etc.) or alternatively with carboxylic acid anhydrides such as maleic anhydride. A functionalized polyolefin is, for example, a PE/EPR mixture, whose weight ratio can vary within a wide range, for example between 40/60 and 90/10, the said mixture being co-grafted with an anhydride, in particular maleic anhydride, according to a degree of grafting of, for example, from 0.01% to 5% by weight.

The functionalized polyolefin (A1) can be chosen from the following (co)polymers, grafted with maleic anhydride or glycidyl methacrylate, in which the degree of grafting is, for example, from 0.01% to 5% by weight;

- PE, PP, copolymers of ethylene with propylene, butene, hexene or octene containing, for example, from 35% to 80% by weight of ethylene;
- ethylene/alpha-olefin copolymers such as ethylene/propylene, EPR (abbreviation for ethylene-propylene-rubber) and ethylene/propylene/diene (EPDM) copolymers;
- styrene/ethylene-butene/styrene (SEBS), styrene/butadiene/styrene (SBS), styrene/isoprene/styrene (SIS) or styrene/ethylene-propylene/styrene (SEPS) block copolymers;
- copolymers of ethylene and vinyl acetate (EVA), containing up to 40% by weight of vinyl acetate;
- copolymers of ethylene and of alkyl (meth)acrylate, containing up to 40% by weight of alkyl (meth)acrylate;
- copolymers of ethylene, of vinyl acetate (EVA) and of alkyl (meth)acrylate, containing up to 40% by weight of comonomers.

The functionalized polyolefin (A1) can also be chosen from ethylene/propylene copolymers predominantly containing propylene, grafted with maleic anhydride and then condensed with monoamino polyamide (or a polyamide oligomer) (products described in EP-A-0 342 066).

The functionalized polyplefin (A1) can also be a co- or terpolymer of at least the following units: (1) ethylene, (2) alkyl (meth)acrylate or vinylester of saturated carboxylic acid, and (3) anhydride such as maleic anhydride or (meth) acrylic acid or epoxy such as glycidyl (meth)acrylate. As examples of functionalized polyolefins of this last type, mention may be made of the following copolymers, in which ethylene preferably represents . at least 60% by weight and in which the termonomer (the function) represents, for example, from 0.1% to 10% by weight of the copolymer:

- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth) acrylic acid or maleic anhydride or glycidyl methacrylate copolymers.

In the above copolymers, the (meth)acrylic acid can be salified with Zn or Li.

The term "alkyl(meth)acrylate" in (A1) or (A2) denotes C1 to C8 alkyl methacrylates and acrylates, and can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

The copolymers (A1) and (A2) mentioned above can be copolymerized in random or sequential form and can have a linear or branched structure.

The molecular weight, the MFI index and the density of these polyolefins can also vary within a wide range, which a person skilled in the art will appreciate. The MFI is the abbreviation for the Melt Flow Index. It is measured according to ASTM standard 1238.

The functionalized polyolefins (B1) are advantageously chosen from any polymer comprising alpha-olefinic units and units bearing polar reactive functions such as epoxy, carboxylic acid or carboxylic acid anhydride functions. Examples of such polymers which may be mentioned are terpolymers of ethylene, of alkyl acrylate and of maleic anhydride or of glycidyl methacrylate, such as the Lotader® products from the Applicant or polyolefins grafted with maleic anhydride, such as the Orevac® products from the Applicant, as well as terpolymers of ethylene, of alkyl acrylate and of (meth)acrylic acid. Mention may also be made of polypropylene homopolymers or copolymers grafted with a carboxylic acid anhydride and then condensed with polyamides or monoamino polyamide oligomers.

The lactam may be caprolactam or lauryllactam or a mixture thereof, and the polymer (A) may be PA 6 or PA 12. Any combination of these possibilities may be used.

As examples of fillers in the fourth form of the invention, of the first or second embodiment, mention may be made of glass fibres or carbon fibres.

The polyamides according to the invention can also contain additives such as:

- dyes;
- pigments;
- optical brighteners;
- antioxidants;
- UV stabilizers.

These additives can be introduced during the polymerization provided that they are inert with respect to the anionic polymerization of lactams.

In the examples which follow, the polyamides obtained are characterized by their intrinsic viscosity. The intrinsic viscosity ($\eta$) is measured with an Ubbelohde viscometer at 25° C. in meta-cresol for 0.5 g of polymer in 100 ml of meta-cresol. This principle is described in Ullmann's Encyclopaedia of Industrial Chemistry—Vol. A 20, pp. 527–528 (1995—5th edition).

The polyamides are also characterized by measuring their mass, which is measured by GPC (gel permeation chromatography), also known as SEC Hsteric exclusion chromatography). In the present patent application, the term SEC denotes measurement of the molecular masses of polymers by steric exclusion chromatography. This technique, and more particularly its application to polyamides and polyether block polyamides, is described in the "Journal of Liquid Chromatography, 11(16), 3305–3319 (1988)".

EXAMPLES

Example 1

Different regulators are tested.

Procedure:

1. Preparation of the Reaction Mixture 25 mol % sodium lactam 12 is prepared beforehand in the following way:

- about 20% of a certain amount of lactam 12 is distilled under nitrogen and under vacuum so as to dehydrate it.
- 25 mol % of sodium is introduced portionwise into the undistilled part of the lactam. This addition takes place while flushing with nitrogen and with stirring, at a temperature below 100° C.

2. Polymerization

The mixture is inertized and brought to 260° C. The polymerization starts by the introduction of 1 mol % of acetanilide.

Results Obtained:

| Regulator (1 mol %) and 1% NaH | Polymerization time (min) | intr. viscosity (0.5% by weight in m-cresol) |
|---|---|---|
| Acetanilide | 11.87 | 1.2 |
| 4-(ethoxy-phenyl)acetamide | 12.27 | 1.18 |
| Benzanilide | 12.6 | 1.15 |
| N-methylacetamide | 12.4 | 1.24 |
| N-ethylacetamide | 13.41 | 1.3 |
| N-methylformamide | 11.94 | 1.45 |

Tests at 270° C.

Procedure

Acetanilide or N,N'-ethylenebisstearamide, NaH and L12 or L6 respectively are weighed out in a reactor and inertized. The reaction mixtures L6 and L12 are prepared at 160° C. The start of the reaction takes place by heating to 270° C. The polymerization time given is the time of increase in torque:

| Regulator (x mol %) and x % of NaH relative to the lactam | Polymerization time (min) | Intr. viscosity (0.5% by weight in m-cresol) | Lactam |
|---|---|---|---|
| acetanilide (0.96/0.96) | 2–3 | 1.22 | L12 |
| ethylenebis-stearamide (0.48/0.97) | 2–3 | 1.1 | L12 |
| ethylenebis-stearamide (0.19/0.37) | 2–3 | 1.1 | L6 |

Acetanilide: 1 functionality per mol
EBS: 2 functionalities per mol

Example 2

The stability of solution (a) is demonstrated

A-Acetanilide/NaH/L12 mixture.

Procedure (Maintenance at 160° C.):

Acetanilide, NaH and L12 (lactam 12) are weighed out in an inertized reactor. The mixture is brought to and maintained at 160° C. under an anhydrous atmrosphere. The L12 content is evaluated by chromatography.

| duration of stability tests at 160° C. | % residual L12 | mol % acet./NaH |
|---|---|---|
| (2 h) | 98.1 | 0.98/1.1 |
| (4 h) | 96.1 | 0.95/1.06 |
| (7 h) | 97.9 | 0.95/1.06 |
| (24 h) | 99.2 | 0.95/1.06 |
| (48 h) | 49.1 | 1.1/1.1 |

B-N,N'-Ethylenebisstearamide (EBS) mixture.

Procedure (Maintenance at 160° C.):

EBS, NaH and L12 (L6) are weighed out in an inertized reactor. The mixture is brought to and maintained at 160° C. under an anhydrous atmosphere. The content of L1 (L6) was then evaluated.

| duration of stability tests at 160° C. | % residual lactam | molar % relative To the lactam EBS/NaH | lactam |
|---|---|---|---|
| (24 h) | 92 | 0.57/1.1 | L12 |
| (24 h) | 98 | 0.55/1.0 | L6 |

EBS = ethylenebisstearamide: 2 functionalities per mol
The reactivity after storage is now demonstrated.

Procedure: Preparation of Sodium Acetanilide.

40 g of finely ground sodium hydroxide are added to a 6 l three-necked round-bottomed flask fitted with a powerful stirrer and, a water separator and containing 4 l of benzene. Boiling is maintained so as to entrain any traces of water, after which 135 g (1 mol) of acetanilide are added. The progress of the displacement of the equilibrium is monitored by the amount of water entrained by the benzene. 92 to 94% of the theoretical amount is thus recovered in the separator in about 8 hours.

The benzene is evaporated off at 60° C./20 mm and then at 60° C./0.5 mm.

The infrared spectrum of the sodium acetanilide shows an intense band characteristic of the $[N—C≡O]^-$ $Na^+$ structure at 1563 $cm^{-1}$. Only a slight shoulder remains at 1665 $cm^{-1}$, characteristic of the free carbonyl of the acetanilide. The NH band at 3400 $cm^{-1}$ has disappeared. The amount of free acetanilide remaining in the sodium acetanilide can thus be evaluated at less than 5% by this method.

Procedure: Stability of the Reaction Mixture Then its Reactivity.

Series a:

A series of tubes containing lactam 12 and 1 mol % of sodium acetanilide was heated to 165° C. The lactam 12 in the samples was extracted in the following way: extraction of the sample in a Soxhlet tube for 2 hours with ethanol, followed by oven-drying for 16 hours at 150° C./0.3 mm.

The start of the polymerization takes place only after 32 hours and its progress is very slow.

2 tubes maintained at 165° C. for 64 hours were heated to 270° C. The polymerization took place normally to lead to a PA with an intrinsic viscosity=1.28.

Series b:

The reaction mixture using L12 is melted at 160° C., maintained at this temperature for different durations, and the polymerization is then carried out by increasing the temperature to 270° C.

| Tests of reactivity (160° C. and then 270° C.) | intr. viscosity dl/g | GPC Mw g/mol | Mn g/mol | Ip | GC: % residual L12 | Mol % regulator/naH in relation to 100 mol lactam |
|---|---|---|---|---|---|---|
| Acetanilide | | | | | | |
| (1 h) | 1.18 | 25120 | 11260 | 2.25 | 0.19 | 1.1/1.1 |
| (6 h) | 1.18 | 25230 | 10730 | 2.35 | 0.2 | 1.1/1.1 |
| (22 h 45) | 1.15 | 24510 | 11170 | 2.2 | 0.22 | 1.1/1.1 |
| (48 h) | 1.11 | 23200 | 9175 | 2.55 | 0.25 | 1.1/1.1 |
| EBS | | | | | | |
| (30 min) | 1.1 | 19200 | 9000 | 2.15 | 0.19 | 0.48/0.97 |
| (6 h) | 1.08 | 17800 | 7700 | 2.3 | 0.16 | 0.57/1.1 |

Acetanilide: 1 functionality per mol
EBS = ethylenebisstearamide: 2 functionalities per mol

Example 3

Batch Polymerization According to Different Procedures

Procedure:
25 mol % sodium lactam 12 is prepared beforehand in the following way:
- about 20% of a certain amount of lactam 12 is distilled under nitrogen and under vacuum so as to dehydrate it.
- 25 mol % of sodium is introduced portionwise into the undistilled part of the lactam. This addition takes place while flushing with nitrogen and with stirring, at a temperature below 100° C.

Polymerization:
The mixture is inertized and brought to 260° C. The polymerization is started by introducing 1 mol % of acetanilide.

| Regulator (1 mol %) and 1% of NaH | Polymerization time (min) | intr. viscosity (0.5% by weight in m-cresol) |
|---|---|---|
| acetanilide | 11.87 | 1.2 |

"Direct Polymerization" Procedure at 270° C.:
Acetanilide or N,N'-ethylerebisstearamide, NaH and L12 are weighed out in a reactor and inertized. The start of the reaction takes place by heating to 270° C.

Table of Tests at 270° C.

| Regulator | NaH | mol % relative to L6 or L12 Regulator | Mw g/mol | Mn g/mol | Ip | Intrinsic viscosity dl/g | % by mass of L12/L6 |
|---|---|---|---|---|---|---|---|
| Acet. | 0.63 | 0.97 | 34150 | 13000 | 2.6 | 1.26 | 100/0 |
| Acet. | 1 | 0.97 | 28550 | 13100 | 2.2 | 1.25 | 100/0 |
| EBS | 1 | 0.57 | 17300 | 7300 | 2.35 | 1.03 | 100/0 |
| EBS | 0.65 | 0.32 | 30200 | 12600 | 2.4 | 1.41 | 100/0 |
| EBS | 0.38 | 0.19 | 25700 | 12900 | 2.0 | — | 0/100 |
| EBS | 0.47 | 0.24 | 30900 | 17700 | 1.75 | 1.32 | 50/50 |
| EBS | 0.51 | 0.25 | — | — | — | 1.25 | 60/40 |
| EBS | 0.54 | 0.27 | 11600 | 22900 | 2.0 | 1.19 | 70/30 |
| EBS | 0.57 | 0.29 | 13700 | 27500 | 2.0 | 1.20 | 80/20 |
| EBS | 0.61 | 0.31 | 17500 | 33100 | 1.9 | 1.44 | 90/10 |

Acet. = acetanilide: 1 functionality per mol
EBS = ethylenebisstearamide: 2 functionalities per mol Procedure for 30 kg of L12:

The L12+regulator mixture is melted at 160° C. (mixture inertized beforehand), the NaH is then introduced, after which the mixture is brought to the temperatures given below:

| mol % relative to the lactam acet./NaH | intr. viscosity | Mw | Mn | Ip | % residual L12 | T ° C. material |
|---|---|---|---|---|---|---|
| 1/1 | 1.17 | 28600 | 14000 | 2.05 | 0.13 | 222 |
| 1/1 | 1.17 | 27400 | 12700 | 2.16 | 0.2 | 223 |
| 1/1 | 1.18 | 27100 | 13000 | 2.1 | 0.15 | 230 |
| 1.6/1.6 | 0.86 | 18300 | 8800 | 2.09 | 0.13 | 226 |
| 1/1 | 1.2 | 26600 | 12000 | 2.24 | 0.15 | 246 |
| 1.28/1.28 | 0.97 | 22200 | 10200 | 2.17 | 0.13 | 232 |

Acet. = acetanilide: 1 functionality per mol

| mol % relative to the lactam NaH/EBS | visco. inh. | Mw | Mn | Ip | % residual L12 | T ° C. material |
|---|---|---|---|---|---|---|
| 2/1 | 1.25 | 27400 | 13200 | 2.05 | 0.28 | 235 |
| 2/1 | 1.08 | 19700 | 9600 | 2.05 | 0.33 | 252 |
| 2/1 | 1.32 | 25900 | 12900 | 2 | 0.16 | 240 |
| 2/1 | 1.1 | 20800 | 10600 | 1.95 | 0.23 | 242 |

-continued

| mol % relative to the lactam | visco. | GPC | | | % residual | T ° C. |
|---|---|---|---|---|---|---|
| NaH/EBS | inh. | Mw | Mn | Ip | L12 | material |
| 2/1 | 1.2 | 25100 | 12400 | 2 | 0.44 | 234 |
| 2/1 | 1.18 | 20300 | 10700 | 1.9 | 0.54 | 234 |

EBS = ethylenebisstearamide: 2 functionalities per mol

Example 4

Alloys by Polymerization a) Lotryl 35BA320 (ethylene/butyl acrylate copolymer with 33–37% of acrylate and an MFI of 260–350.

The mixture (L12+acetanilide+NaH+Lotryl) is inertized, melted at 160° C. and then homogenized. The polymerization is started by increasing the temperature to 270° C.

The L12/acetanilide (or NaH) ratio is 1 mol %.

The residual L12 content is ~0.2%.

| | Analysis by GPC | | |
|---|---|---|---|
| Product | Mn g/mol | Mw g/mol | I$_p$ |
| PA12 | 10000 | 25200 | 2.5 |
| PA12 + 10% Lotryl | 8900 | 24000 | 2.65 |
| PA12 + 20% Lotryl | 5700 | 18000 | 3.25 | b) PPE

The mixture (L12+acetanilide+PPE) is inertized, brought to 270° C. and then homogenized. The NaH is introduced into this mixture and polymerization takes place immediately.

The L12/acetanilide (or NaH) ratio is 1 mol %.

Demonstration of the polymerization by the increase in the torque during the polymerization.

c) Glass Fibres

The mixture (L12+acetanilide+NaH+glass fibres) is inertized, brought to 160° C. and then homogenized. The polymerization is started by increasing the temperature to 270° C.

The L12/acetanilide (or NaH) ratio is 1 mol %.

Demonstration of the polymerization by the increase in the torque during the polymerization.

Example 5

4. Polymerization in an Extruder a) The reaction mixture (L12+0.65 mol % acetanilide+0.65 mol % NaH, with Acetanilide: 1 functionality per mol) is prepared at 160° C. in 2 reactors under an inert and anhydrous atmosphere.

This reactor then alternately feeds, via a transfer line, an adapted continuous reactor (in this case a Werner 30 extruder which may or may not be fitted with a gear pump downstream or may or may not be fitted with a metering pump upstream) in which the polymerization takes place at a temperature between 230 and 295° C.

The process is stable for 100 hours.

The intrinsic viscosity at 0.5% in m-cresol is between 1.40 and 1.50 dl/g.

b) The reaction mixture (L12+0.51 mol % EBS+1.0 mol % NaH or L12+0.25 mol % EBS+0.50 mol % NaH, with EBS: 2 functionalities per mol) is prepared at 160° C. in a reactor under an inert and anhydrous atmosphere.

This reactor then feeds, via a transfer line, an adapted continuous reactor (in this case a Clextral BC21 extruder which may or may not be equipped with a geared pump downstream or may or may not be equipped with a metering pump upstream) in which the polymerization takes place at a temperature between 160 and 330° C.

The intrinsic viscosity at 0.5% in m-cresol is between 1.09 and 1.21 dl/g, or respectively 1.37–1.84 dl/g.

What is claimed is:

1. A process for the anionic polymerization of lactams, comprising:
    (a) dissolving (i) a catalyst capable of creating a lactamate and (ii) a regulator chosen from the amides of formula R1—NH—CO—R2, in which R1 can be substituted with a radical R3—CO—NH— or R3—O— and in which R1, R2 and R3 denote an aryl, alkyl or cycloalkyl radical, in molten lactam; the temperature of the resultant reaction solution being between the melting point of the lactam and 15° C. higher than the melting point of the lactam,
    (b) introducing the solution from step (a) into a mixing device or mold and then heating said solution to a temperature which is sufficient to obtain bulk polymerization of the lactam in no more than 15 minutes.

2. A process according to claim 1, further comprising also introducing molten lactam not containing the mixture of catalyst and regulator in step (b).

3. A process according to claim 1, wherein the solution from step (a) is introduced into a mold.

4. A process according to claim 3, in which the polymerization of the lactam is carried out in the presence of one or more polymers (A) which are introduced either into the solution (a) or into the mixing device in step (b) or into the molten lactam which is added in addition to that originating from (a) or according to any combination of these possibilities.

5. A process according to claim 3, in which the polymerization of the lactam is carried out in the presence of one or more fillers which are introduced either into the solution (a) or into the mixing device in step (b) or into the molten lactam which is added in addition to that originating from (a) or according to any combination of these possibilities.

6. A process according to claim 3, in which molten lactam containing neither catalyst nor regulator is added in step (b) in addition to the solution from step (a) and this molten lactam is optionally mixed in line with that obtained from step (a) before introduction in the mould.

7. A process according to claim 3, in which the polymerization of the lactam is carried out in the presence of one or more polymers (A) which are introduced either into the solution from step (a) or into the mould or into the molten lactam which is added in addition to that originating from (a) or alternatively during the in-line mixing of the lactam originating from (a) and of the lactam added in addition to that originating from (a) or a combination of all these possibilities.

8. A process according to claim 3, in which the polymerization of the lactam is carried out in the presence of one or more fillers which are introduced either into the solution from step (a) or into the mould or into the molten lactam which is added in addition to that originating from step (a) or alternatively during the in-line mixing of the lactam originating from (a) and of the lactam added in addition to that originating from (a) or a combination of all these possibilities.

9. A process according to claim 3, in which the catalyst is chosen from sodium, potassium, alkali metal hydrides and hydroxides, and alkali metal alkoxides, sodium methoxide, and sodium ethoxide.

10. A process according to claim 3, in which the regulator is chosen from acetanilide, benzanilide, N-methylacetamide, N-ethylacetamide, N-methylformamide, (4-ethoxyphenyl)-acetamide, alkylenebisamides, ethylenebis-stearamide (EBS) and ethylenebisoleamide.

11. A process according to claim 3, in which the ratio of the catalyst to the regulator, in moles, is between 0.5 and 2; the number of moles of regulator being expressed as the number of moles of amide groups.

12. A process according to claim 3, in which the proportion of catalyst in the lactam in step (b) is between 0.1 mol and 5 mol per 100 mol of lactam.

13. A process according to claim 3, in which the lactam is lauryllactam, the temperature of step (a) is between 155 and 180° C., and the temperature of step (b) is between 200 and 350° C.

14. A process according to claim 1, wherein said catalyst is chosen from sodium, potassium, alkali metal hydrides, alkali metal hydroxides, and alkali metal alkoxides.

15. A process according to claim 1, wherein said regulator is chosen from acetanilide, benzanilide, N-methylacetamide, N-ethylacetamide, N-methylformamide, (4ethoxyphenyl)-acetamide and alkylenebisamides.

16. A process according to claim 1, wherein the ratio of the catalyst to the regulator, in moles, is between 0.5 and 2, wherein the number of moles of regulator is expressed as the number of moles of amide groups.

17. A process according to claim 1, wherein the proportion of catalyst in the lactam in step (b) is between 0.1 mol and 5 mol per 100 mol of lactam.

18. A process according to claim 1, wherein the lactam is lauryllactam, the temperature of step (a) is between 155 and 180° C., and the temperature of step (b) is between 200 and 350° C.

19. A process according to claim 1, wherein the ratio of the catalyst to the regulator, in moles, is between 0.8 and 1.2, wherein the number of moles of regulator is expressed as the number of moles of amide groups.

20. A process according to claim 1, wherein the proportion of catalyst in lactam in step (b) is between 0.3 mol and 1.5 mol per 100 mol of lactam.

21. A processing according to claim 1, wherein the lactam is laruyllactam, the temperature of step (a) is between 160 and 170° C., and the temperature of step (b) is between 230 and 300° C.

* * * * *